UNITED STATES PATENT OFFICE.

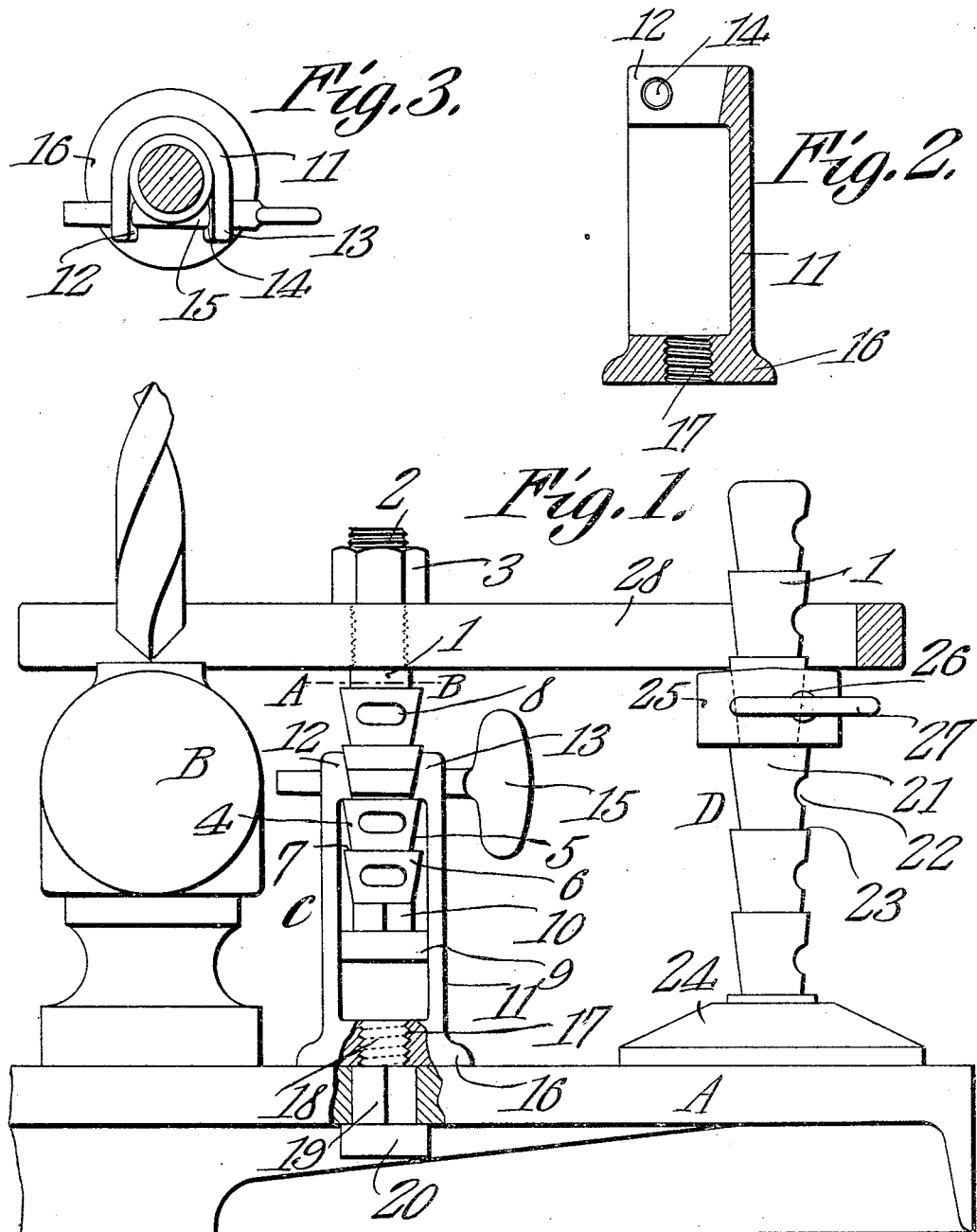

NICHOLAS W. TRAUTNER, OF RED WING, MINNESOTA, ASSIGNOR OF TWO-FIFTIETHS TO GEORGE W. TRAUTNER, FIFTEEN-FIFTIETHS TO H. C. KOHN, AND FIFTEEN-FIFTIETHS TO J. R. TRAUTNER, OF RED WING, MINNESOTA.

BOLT.

954,481.   Specification of Letters Patent.   Patented Apr. 12, 1910.

Application filed August 27, 1909.   Serial No. 514,919.

*To all whom it may concern:*

Be it known that I, NICHOLAS W. TRAUTNER, a citizen of the United States, residing at Red Wing, in the county of Goodhue and State of Minnesota, have invented a new and useful Bolt, of which the following is a specification.

My invention relates to improvements in adjustable clamping bolts used in setting up work on the bed plate of machine tools, and has for an object to provide a device of this character in which the bolt is supported in upright position upon the bed plate of the machine by a pedestal which is secured to the bed plate independent of the bolt so that a finer adjustment of the bolt may be obtained than heretofore.

A further object is to provide a pedestal for the clamping bolt having a flared base which rests upon the bed plate of the machine and constitutes a rigid foundation which securely anchors the bolt against rocking movement.

A still further object is to provide a pedestal equipped with a stud screw threaded into its bottom base and by means of which the pedestal may be adjusted to any portion of the T slot of a machine bed plate.

With the above advantages and other objects in view, which will appear as the description proceeds, my invention embraces the novel details of construction and combination of parts which will be hereinafter more fully described and claimed.

In the accompanying drawings forming part of this specification;—Figure 1 is a side elevation of a portion of a drill press showing my improved clamping bolts in applied position thereto. Fig. 2 is a longitudinal sectional view of the bolt-supporting pedestal. Fig. 3 is a transverse sectional view of the bolt supporting pedestal assembled with the clamping bolt taken on the line A—B Fig. 1.

Referring now to the drawing, A designates the bed plate of a drill press upon which is set up and clamped in position for drilling, a casting B, the letter C designating in general the preferred form of my invention, and the letter D a modification thereof. The clamping bolt C comprises a body portion 1 having a threaded extremity 2 upon which is screwed a nut 3. The opposite end portion of the bolt is provided with a series of frusto-conical portions 4 concentrically arranged and each having a smaller end 5 which merges into the larger end 6 of the adjacent portion forming shoulders 7. Each of the frusto-conical portions is provided in its side with a tapered notch 8, the purpose of which will presently appear. The end opposite the threaded extremity of the bolt is enlarged circumferentially to provide an annular head 9, and that portion of the bolt intermediate the head and adjacent conical portion is squared to form a neck 10. The object of this construction is to permit the bolt to be engaged in the T slots in the bed plate of a machine tool if desired, independently of the pedestal 11 hereinafter described, the squared neck preventing independent rotation of the bolt, which latter is held secure to the bed plate by the head 9 bearing against the under side of the bed plate.

For anchoring the clamping bolt upon the bed plate of the drill press, a pedestal 11 is provided. The pedestal 11 comprises a U shaped body portion having at its upper end a pair of inwardly turned jaws 12 and 13, the opposed faces of which are inclined to receive the frusto-conical portions. Each of the jaws is provided with an annular opening 14 through which is inserted a tapered key-pin 15 which engages the before mentioned notches 8 of the frusto-conical portion and operates to lock the bolt to the pedestal. The lower end of the pedestal is provided with a flared base 16 which is adapted to rest upon the bed-plate and forms a rigid foundation when secured to the latter which will positively prevent any rocking or springing movement of the clamping bolt during the operation of the machine.

Formed centrally in the base of the pedestal is a screw-threaded annular opening 17 for engagement with the screw-threaded terminal of a stud nut 18, which latter is provided with a squared neck 19 adjacent the screw-threaded end and terminates in an annular head 20 remote from said end. The pedestal may be set up upon the bed plate of a machine with the opening in its base registering with the T slot in the bed plate and the stud nut inserted through the T slot and engaged with the opening in the base of the pedestal by rotating the pedestal axially, the annular head 20 limiting the advance of the nut and the squared neck 19 preventing the rotation of the nut in the slot. The bolt is now assembled with the pedestal and adjusted to securely clamp the casting upon the bed plate of the machine, by engaging the tapered key-pin with the frusto-conical portion that will approximate the desired adjustment and then manipulating the clamping nut to take up the remaining distance between the clamping rod and casting. It is thus seen that the pedestal may be adjusted to any portion of the T slot in the bed plate of the machine and locked thereto independent of the clamping bolt and that the pedestal when so secured will form a rigid foundation which will positively prevent any rocking movement of the clamping bolt.

The clamping bolt D comprises a body portion composed of a series of superposed concentric frusto-conical portions 21 each having a tapered notch 22 formed in its side and having its smaller end merged into the larger end of the adjacent portion to form shoulders 23. The bolt terminates at its lower end in an integral flange 24 which rests upon the bed plate of the machine and holds the bolt in an upright position thereupon. A U shaped nut 25 is assembled with the bolt having inclined inner walls to receive the conical portions. The nut 25 is provided in its opposite sides with alined openings 26 adapted to aline with the notches 22 of the conical portions and when in alinement with any particular notch may receive a tapered key-pin 27 which operates to lock the nut upon the bolt. The top surface of the sides is inclined from the lateral edges thereof toward the center of the nut so that the clamping rod 28 will have a true bearing surface upon which to rest.

From the foregoing description taken in connection with the accompanying drawing, it is thought that the construction and operation of my invention will be easily understood without a more extended explanation, it being understood that various changes in the form, proportion and minor details of construction may be made without sacrificing any of the advantages or departing from the spirit of the invention.

What is claimed is:—

1. The combination with a bolt having a threaded portion, and a series of concentric frusto-conical portions, of a pedestal for the same consisting of a U shaped body portion having at its upper end oppositely disposed jaws provided with inclined walls to receive the frusto-conical portion of said bolt and at its lower end with a base adapted to rest upon the bed plate of a machine tool.

2. The combination with a bolt having a threaded portion, and a series of concentric frusto-conical portions, of a pedestal for the same consisting of a U shaped body portion having at its upper end a pair of inturned jaws, the opposed faces of which are inclined to receive the frusto-conical portions of said bolt, the lower end of the said body portion being provided with a flared base adapted to rest upon the bed plate of a machine tool.

3. The combination with a bolt having a threaded portion, and a series of mutilated frusto-conical portions, of a pedestal for the same consisting of a U shaped body portion having at its upper end a pair of spaced jaws the opposed faces of which are inclined to receive the frusto-conical portions, and at its lower end a base adapted to rest upon the bed plate of a machine tool, and a pin carried by said jaws engageable with said mutilations whereby to lock said bolt to said pedestal.

4. The combination with a bolt having a threaded portion, and a series of frusto-conical portions each having a laterally disposed notch, of a pedestal for the same comprising a U shaped body portion having a pair of spaced jaws adapted to receive said conical portions, and a flared base equipped with a stud bolt threaded into its bottom face and adapted to adjustably secure the pedestal to the bed plate of a machine tool, and a pin carried by said jaws engageable with the notches in said pedestal.

5. The combination with a bolt having a threaded portion, and a series of concentric frusto-conical portions each provided with a laterally disposed notch, of a pedestal for the same comprising a U shaped body portion having a pair of inturned jaws at its upper end adapted to receive said frusto-conical portions, and a flared base at its lower end adapted to rest upon the bed plate of a machine tool, a stud nut screw threaded into the bottom face of said base in alinement with said bolt and adapted to adjustably secure the pedestal to said bed plate, and a pin carried by said jaws engageable with the notches in said frusto-conical portions whereby to lock said bolt to said pedestal.

In testimony that I claim the foregoing as my own, I have hereto affixed my signature in the presence of two witnesses.

NICHOLAS W. TRAUTNER.

Witnesses:
C. P. DIEPENBROCK,
THO. MAIN.